United States Patent [19]
Peñaloza et al.

[11] 3,819,098
[45] June 25, 1974

[54] FILM FORWARDING MECHANISM

[76] Inventors: Arturo Castrejon Peñaloza, Calzada Vicente Guerrero 19-A, Acapulco, Mexico; Jose Datshkovsky, deceased, late of Acapulco, Mexico; by Raisa Bardach Datshkovsky, legal representative, Mexico City, Mexico

[22] Filed: Oct. 16, 1972

[21] Appl. No.: 297,906

Related U.S. Application Data
[63] Continuation-in-part of Ser. No. 78,351, Oct. 6, 1970.

[52] U.S. Cl............... 226/85, 226/113, 352/185, 352/189
[51] Int. Cl............... G03b 1/24, G03b 1/34
[58] Field of Search......... 226/113, 114, 76, 84, 85; 352/187, 188, 189, 190, 185

[56] References Cited
UNITED STATES PATENTS

| | | |
|---|---|---|
| 1,165,629 | 12/1915 | Schneider............... 352/190 |
| 1,308,984 | 7/1919 | Evans............... 226/114 |
| 2,560,919 | 7/1951 | Bedford............... 226/85 X |
| 2,762,255 | 9/1956 | Anderson............... 226/114 X |
| 3,065,890 | 11/1962 | Fox............... 226/114 X |

*Primary Examiner*—Richard A. Schacher
*Attorney, Agent, or Firm*—Waters, Roditi, Schwartz & Nissen

[57] ABSTRACT

A film forwarding mechanism for motion-picture projectors, cameras or the like, includes a lower sprocket driven by an intermittently rotatably shaft located below the aperture plate and under the optical axis, the teeth of which are coupled with side perforations of the film, and a second intermittently rotatable sprocket located above the aperture plate and the optical axis, and aligned with the lower intermittent sprocket. Pressure rollers maintain the film seated against each of the sprockets, and an eccentric guide roller smooths and curves the film onto a shoe rest.

3 Claims, 6 Drawing Figures

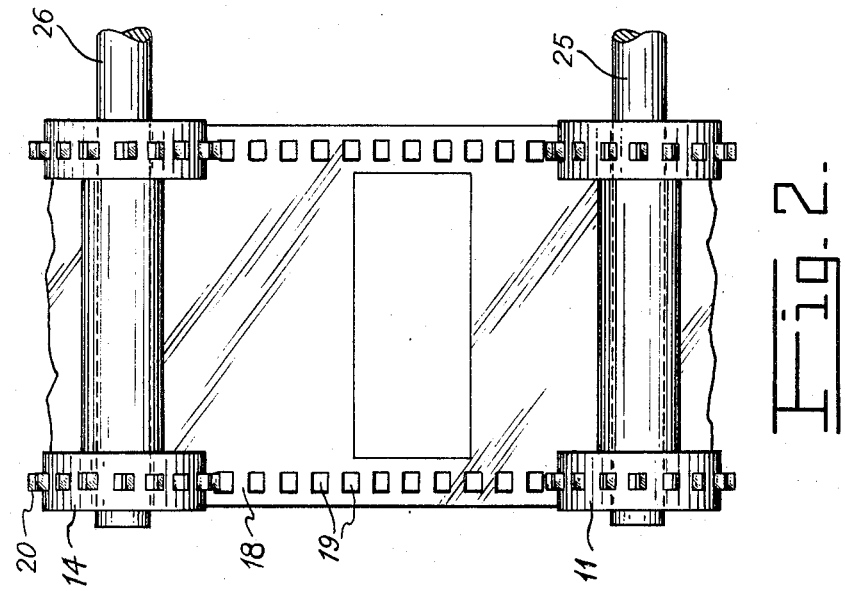
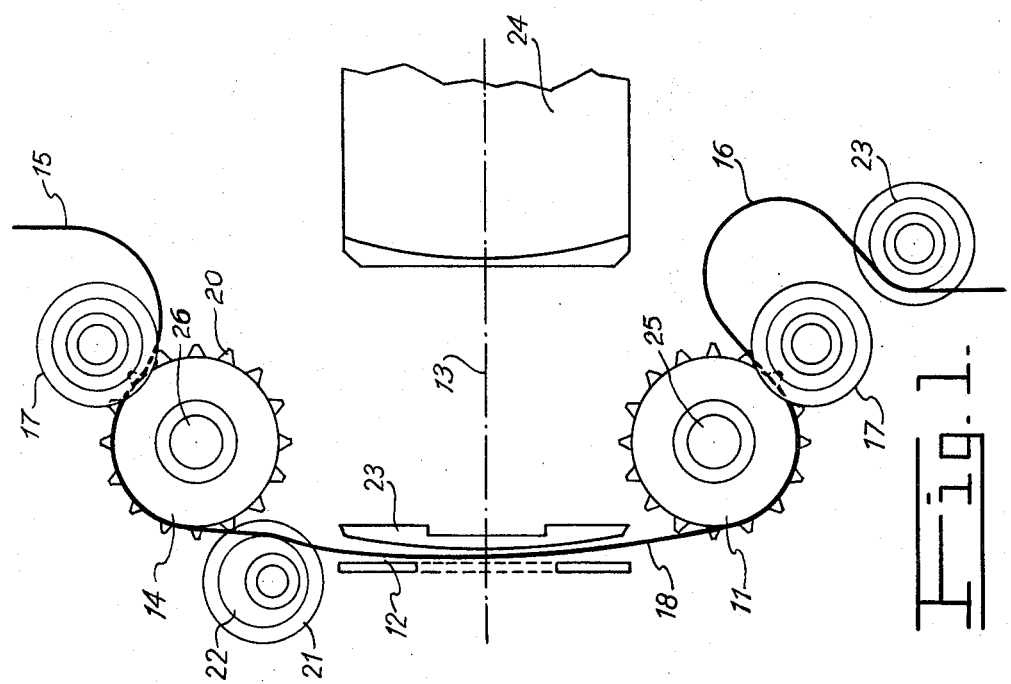

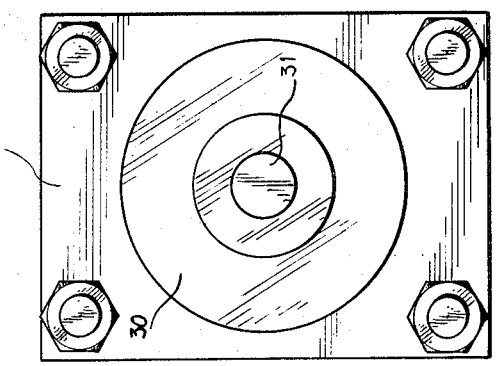
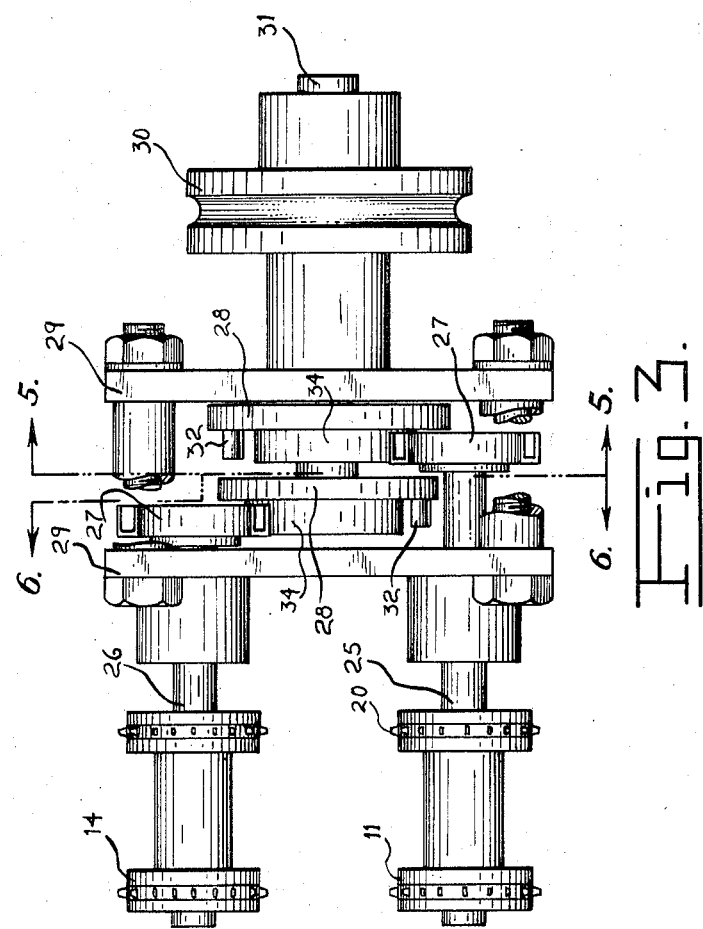

FILM FORWARDING MECHANISM

CROSS RELATED APPLICATION

This application is a C-I-P of application Ser. No. 78,351 filed Oct. 6, 1970 and now abandoned.

BACKGROUND OF THE INVENTION

Currently, all of the mechanisms in motion-picture projectors, cameras and the like, have been designed and manufactured with only one intermittently driven sprocket, this being located beneath the aperture plate and under the optical axis, the teeth of this single intermittently driven sprocket rotating or pulling said film, by introducing its teeth into the film side perforations and successively pulling or rotating the film from frame to frame, at the usual speed of about 24 frames per second.

The intermittent assembly, when rotating or pulling said film by means of the intermittent sprocket, encounters a stress to be counteracted, that is, the resistive friction that smooths and draws-out the film by means of strain. This assembly includes springs, shoes, guides and the like, to avoid side movements and to smooth said film with resistive friction such that, when the maximum turning speed of said sprocket is attained, said film, upon being rapidly displaced, does not become unstable, thus avoiding upwardly and downwardly movements or any undesirable vibrations.

BRIEF SUMMARY OF THE INVENTION

The present invention is directed to a mechanism for film advance, which eliminates the number of pieces forming the mechanism employed to press the film down, by means of resistive friction, this being attained by adding a second intermittently rotatable sprocket.

This second intermittently rotatable sprocket is located above the operation plate, above the optical axis and aligned with the conventional lower intermittently driven sprocket.

The two intermittent sprockets are rotated in the same direction, in a completely synchronous manner and in tension, both in the driving periods and in the rest periods of the intermittent motion.

Said upper sprocket has a loop or crimp of film maintained thereagainst by a pressure roller.

The lower sprocket also has a loop or crimp of film maintained thereagainst by a pressure roller, the purpose of the upper loop at the entrance of said film and the lower loop at the exit thereof being to takeup the inertia by reducing the length of the film subjected to the sudden intermittent motion.

Once inserted and located, the film is mounted onto said upper and lower sprockets, taking care that the side perforations thereof are coupled with the teeth of the said two intermittently driven sprockets, in order to secure the forward movement, and then said upper and lower pressure rollers are closed. Finally, an upper pressure roller is adjacent the optical axis and carries a variable eccentrical mounting in order to draw-out and smooth the film and curve the same onto said rest shoe.

BRIEF DESCRIPTION OF THE DRAWINGS

FIG. 1 is a side-elevational view diagrammatically illustrating the film forwarding mechanism of the present invention;

FIG. 2 is a plan view of the mechanism illustrated in FIG. 1;

FIG. 3 is a side elevational view of the drive means of the sprockets of the film forwarding mechanism;

FIG. 4 is an end view of the drive means of FIG. 3;

DETAILED DESCRIPTION

Figure 6:
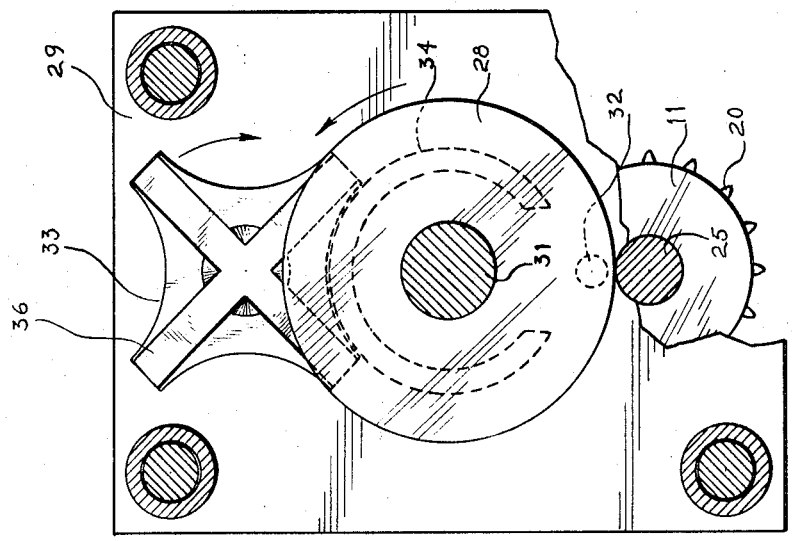
FIG. 6 is a section taken on line 6—6 in FIG. 3.
Figure 5:
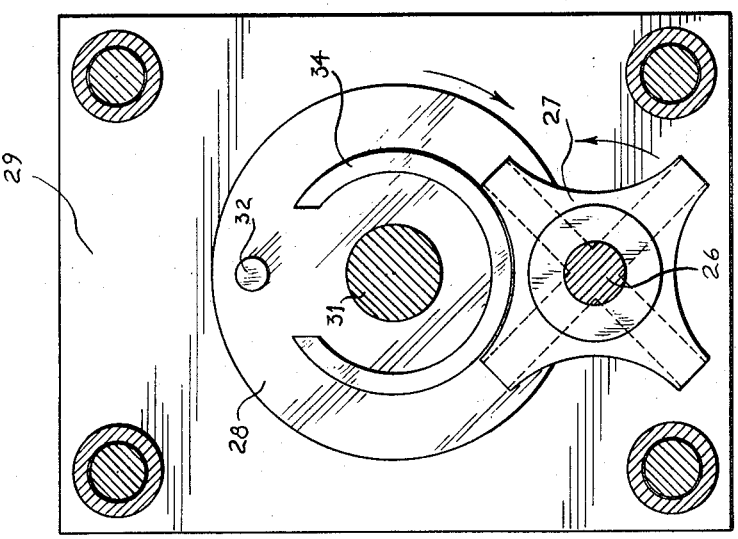
FIG. 5 is a section taken on line 5—5 in FIG. 3.

The improved film forwarding mechanism for motion picture projectors, cameras and the like of the present invention, to avoid friction and undesirable stresses, is constituted by a lower sprocket 11, driven by an intermittently rotatable shaft 25 of a lower maltese cross drive located under the aperture plate 12 and below the optical axis 13 and a second sprocket 14 driven by an intermittently rotatable shaft 26 of an upper maltese cross, located above the opening plate 12 and the optical axis 13, aligned with said first sprocket 11.

The two sprockets 11 and 14 are rotated in the same direction, in a completely synchronous manner and in tandem both in the driving portions and rest periods of said intermittent motion.

The upper sprocket 14 is fed through a loop or crimp 15 of film and a pressure roller 17 holds the film smoothly against the upper intermittent sprocket 14. From the lower intermittent sprocket 11 extends a loop or crimp 16 of film, and a pressure roller 17 holds the film smoothly against the lower intermittent sprocket 11.

The purpose of the upper loop 15 at the entrance of the film and the lower loop 16 at the exit of the film 18, is to take up the inertia by reducing the length of the film subjected to the sudden intermittent motion.

Once inserted and framed-on, the film 18 is mounted on the upper and lower intermittent sprockets 14 and 11, with the side perforations 19 of the film being seated on teeth 20 of said two intermittent sprockets, so as to secure forward frictionless movement, and then the upper and lower pressure roller 21 is set on the film, said roller 21 carrying an eccentric variable mounting 22 for drawing-out and smoothing the film and curving the same onto a rest shoe 23. When these operations have been done, the mechanism is ready to operate. The eccentric guide roller 22 between the upper sprocket 14 and the rest shoe 23 acts to smooth and guide the film onto the rest shoe 23 by avoiding loss of control of the film due to the fact that the teeth of the sprocket are smaller than the normal film holes in which they engage. Hence, there is normally a small clearance between the edges of the film holes and the teeth of the sprocket and this clearance produces a small vibration of the film while it is being fed, especially at high feeding speeds. With the use of the eccentric roll 22, the clearance between the edges of the film holes and the teeth of the sprockets is taken up by drawing out the film, until the respective upper and lower edges of the film holes come in contact with the teeth of the respective sprockets 11 and 14, obtaining in this manner a perfect control of the film between the sprockets without any vibration of the film; stated in another way, by rotating eccentric roll 22, the film path is adjusted slightly until the teeth of the sprockets bear against the edges of the film holes while the film is smoothed and guided on the rest shoe 23 thereby eliminating any vibration during the drive of the film.

The intermittent drive mechanism for imparting intermittent synchronous movement to the film forwarding mechanism, comprises a main shaft 31 driven by a pulley 30 fixedly mounted thereon and coupled to a power source (not shown). The main shaft 31 includes at one end a pair of spaced, parallel circular plates 28 each having a projecting pin 32 located at a respective face of each of the plates 28, the pins being disposed in diametrically opposite locations at the periphery of plates 28, the axes of said pins 32 being parallel to the longitudinal axis of the shaft 31. The pins 32 are capable of respectively engaging two maltese crosses 27 located in different planes and having concave faces 33 engaging the outer surfaces of annular rings 34 mounted concentrically on and extending from the same surface of the circular plates 28 as pins 32. The rings 34 have identical cut portions in order to allow the conventional maltese cross motion, to intermittently drive shafts 25 and 26 in synchronism. Therefore, for each complete revolution of the main shaft 31, each pin 32 engages its corresponding maltese cross 27, the pin riding on rail 36 of its corresponding maltese cross to effect a quarter of a revolution of its associated shaft 25,26. Main shaft 31 and shafts 25 and 26 are supported in a frame 29 provided with suitable spacers and fastening means. The significance of the drive mechanism is that both shafts 25 and 26 rotate synchronously one quarter of revolution for each revolution of the main shaft 31.

When the projector is started, the two sprockets 11 and 14 rotate synchronously in the same direction, and require no pull on the film in order to overcome frictional resistive action, since this does not exist, nor do any other restraining forces of any kind; the sprockets 11 and 14 carry the film 18 past the opening plate 12, sliding the same onto the rest shoe 23 in a completely stable, frictionless manner, and without causing damage to the perforations 19 of the film.

The sprockets operate free of stress and the film receives no rough handling that can misadjust any part of the same, thus increasing indefinitely the life of the film.

In FIG. 1 there is also shown a cylindrical roller 25 which carries the film to the fixed lower feeding spool.

The loop 15 of the film comes from the fixed feeding spool of the film (not shown) and there is also illustrated the conventional objective-lens 24.

The above disclosure of the invention has been made regarding a specific embodiment thereof; however, it should be understood by those skilled in the art that changes of shape and detail are to be taken as within the spirit and scope of the invention as defined by the appended claims.

What is claimed is:

1. A film forwarding mechanism for motion picture apparatus having an aperture plate positioned on an optical axis, said mechanism comprising a lower sprocket, a first shaft coupled in driving relation with said lower sprocket, an upper sprocket, a second shaft coupled in driving relation with said upper sprocket, means coupled to said first and second shafts to drive the same intermittently and in synchronism, said sprockets including teeth engaging in perforations in film to advance the film intermittently in synchronism and substantially free of stress, a rest shoe adjacent said aperture plate, and pressure roller means for maintaining the film in seated relation on said sprockets while guiding the film onto said rest shoe, said means for driving the first and second shafts comprising first and second Maltese crosses each coupled to a respective shaft, and a main drive shaft coupled to the Maltese crosses to drive the same in synchronism.

2. A film forwarding mechanism as claimed in claim 1 wherein said pressure roller means comprises an eccentric guide roller between said upper sprocket and said rest shoe to smooth and guide the film onto the rest shoe.

3. A film forwarding mechanism as claimed in claim 2 further comprising a pressure roller associated with each sprocket for pressing the film against said sprocket.

* * * * *